(12) United States Patent
Keyes

(10) Patent No.: US 9,377,150 B2
(45) Date of Patent: Jun. 28, 2016

(54) METHOD AND APPARATUS FOR PRESERVING THE LONG TERM STRUCTURAL INTEGRITY OF BONDED FOAM PRE-INSULATED PIPING SYSTEMS

(71) Applicant: Thermacor Process, Inc., Fort Worth, TX (US)

(72) Inventor: Thomas Joseph Keyes, Fort Worth, TX (US)

(73) Assignee: Thermacor Process, Inc., Fort Worth, TX (US)

( * ) Notice: Subject to any disclaimer, the term of this patent is extended or adjusted under 35 U.S.C. 154(b) by 16 days.

(21) Appl. No.: 14/594,546

(22) Filed: Jan. 12, 2015

(65) Prior Publication Data

US 2015/0233518 A1    Aug. 20, 2015

Related U.S. Application Data

(60) Provisional application No. 61/942,333, filed on Feb. 20, 2014.

(51) Int. Cl.
*F16L 9/14* (2006.01)
*F16L 59/12* (2006.01)
*F16L 59/10* (2006.01)

(52) U.S. Cl.
CPC .............. *F16L 59/123* (2013.01); *F16L 59/10* (2013.01); *Y10T 29/49428* (2015.01)

(58) Field of Classification Search
CPC ........... F16L 59/028; F16L 59/14; F16L 9/02; F16L 9/14

USPC ............ 138/149, 148, 112–114, 108, DIG. 9; 29/525.13, 525.14, 506, 510, 272, 282
See application file for complete search history.

(56) References Cited

U.S. PATENT DOCUMENTS

| | | | | |
|---|---|---|---|---|
| 3,865,145 | A * | 2/1975 | McKay | F16L 59/12 138/113 |
| 4,219,224 | A * | 8/1980 | Hanley | F16L 59/123 138/113 |
| 4,415,184 | A * | 11/1983 | Stephenson | E21B 17/00 138/149 |
| 6,883,548 | B2 * | 4/2005 | Schippl | F16L 59/065 138/112 |

(Continued)

OTHER PUBLICATIONS

Thermacor Process, Inc., HT-406—High Temp Steel Piping System, specification guide, 2 pages, Feb. 2008.

*Primary Examiner* — Patrick F Brinson
(74) *Attorney, Agent, or Firm* — Charles D. Gunter, Jr.

(57) ABSTRACT

A section of pipe is used in a pre-insulated piping system where the system is made up of lengths of insulated and jacketed pre-insulated piping. Each length of piping is made up of an inner carrier pipe having an interior surface and an exterior surface. An envelope of bonded foam insulation surrounds the inner pipe exterior surface and an outer protective jacket surrounds the envelope of foamed insulation. The length of piping has a joining end for joining to an adjacent length of piping, whereby the adjacent lengths of piping provide a continuous length of fluid conduit for conveying high temperature fluids. A series of metal thrust collars are located at spaced intervals along the length of the inner carrier pipe are enveloped within the layer of foamed insulation. The presence of the metal thrust collars along the length of the inner metal carrier pipe increases the surface area contact of the insulation and metal components of the system and serves to prevent disbondment of the foam insulation from the inner metal carrier pipe over time.

13 Claims, 4 Drawing Sheets

(56) References Cited

U.S. PATENT DOCUMENTS

| | | | |
|---|---|---|---|
| 6,978,807 B1 * | 12/2005 | Keyes | F16L 55/00 138/112 |
| 7,028,717 B1 * | 4/2006 | Keyes | F16L 59/15 138/112 |
| 7,418,979 B2 | 9/2008 | Keyes | |
| 7,997,303 B2 * | 8/2011 | Hoffhaus | F27D 3/18 138/108 |
| 8,468,677 B2 | 6/2013 | Keyes, Sr. | |
| 8,544,502 B2 | 10/2013 | Keyes, Sr. | |
| 9,140,386 B2 * | 9/2015 | Keyes | F16L 1/06 |
| 2005/0103393 A1 * | 5/2005 | Foxton | F16L 59/143 138/149 |
| 2009/0301596 A1 * | 12/2009 | van Oosten | F16L 9/18 138/149 |
| 2011/0192486 A1 * | 8/2011 | Keyes | F16L 59/145 138/149 |

* cited by examiner

METHOD AND APPARATUS FOR PRESERVING THE LONG TERM STRUCTURAL INTEGRITY OF BONDED FOAM PRE-INSULATED PIPING SYSTEMS

CROSS REFERENCE TO RELATED APPLICATIONS

The present application claims priority from a previously filed provisional application Ser. No. 61/942,333, filed Feb. 20, 2014, entitled "Method and Apparatus for Preserving the Long Term Structural Integrity of Bonded Foam Pre-Insulated Piping Systems", by the same inventor.

BACKGROUND OF THE INVENTION

1. Field of the Invention

The present invention relates to generally to fully bonded foam pre-insulated piping systems and, more specifically, to a method and apparatus for promoting the long term integrity of such systems by countering the deleterious effects of age and other deteriorating influences.

2. Description of the Prior Art

Insulated pipelines are needed in a variety of situations. For example, distributed HVAC (heating, ventilation, and air conditioning) applications utilize chilled water for cooling and steam and hot water for heating. The chiller and boiler are typically contained in a central location and the chilled water and steam and hot water are distributed to other locations. For example, on a school campus the chiller and boiler may be located in a power plant building. The chilled water and steam are distributed to classrooms in separate buildings. A set of insulated pipelines is used to convey the chilled water from the chiller to other locations and back to the chiller. Another set of insulted pipelines is used to carry the steam or hot water from the boiler to the other locations and back to the boiler. It is necessary for the pipes to be insulated in order to retain the internal temperature of the medium being transported and keep heating and cooling losses at a minimum. The insulated pipelines are usually located underground.

So called "pre-insulated piping systems" of the type under consideration are conventional and commercially available. There are predominately two types of such pre-insulated piping systems in use: Class-A drainable dryable testable (DDT); and polyurethane or polyisocyanurate "fully bonded" foam systems. In the bonded type system, the foam and outer jacket, being bonded, do not move relative to the inner pipe. In the Class-A type system, on the other hand, the insulated inner pipe is designed to move independently of the associated outer jacket. In fact, there is an air gap between the inner pipe and outer carrier pipe in the class-A type system.

The present application is directed toward the bonded foam type system. These systems utilize a steel pipe to convey fluid, i.e., steam and/or superheated water, where the fluid is at a different temperature as compared to the ambient environment. Around the outside of the steel pipe is a layer of insulating foam such as, for example, polyisocyanurate foam. In the case of high temperature piping systems, the insulating foam serves to keep heat loss from the starting location of the pipeline to the ending location at a minimum. Around the outside of the foam is a thin jacket of thermoplastic material, such as high density polyethylene (HDPE). The plastic jacket protects the foam from mechanical damage and also provides a watertight seal to prevent corrosion of the steel pipe. Although steel is commonly used for the inner pipe which carries the media to be piped, copper, aluminum or other metals as well as fiberglass, PVC, and similar materials may be utilized, as well.

The most important engineering criteria for a foam system of the type under consideration is that it must be treated as a "bonded" system. In other words, the foam is bonded to both the carrier pipe and the outer jacket. In such a case, the bonded system acts as a monolithic unit moving underground. Higher temperatures can act adversely upon the bonded foam system, however. The hot fluid in the steel carrier pipe causes the carrier pipe to thermally expand. At temperatures of 400° F., this expansion is on the order of 2.8 inches per 100 feet of pipe. This expansion is not a problem as long as the system remains bonded and the carrier pipe, foam and jacket move together as one unit underground. This movement is controlled by the expansion force of the steel carrier pipe, but it is the bond strength of the foam to the pipe and jacket that is important in keeping the system moving together. This monolithic movement of the system occurs along each incremental length of a particular run, and as long as total movement is not greater than about 2 to 3 inches and the system remains bonded, no undue stress is subjected at any one point of the jacket. If the system were to disbond, however, the surrounding soil would fix the jacket in place and the carrier pipe would still thermally expand thereby pushing through and possibly destroying the jacket at the first change of direction.

Generally speaking, the proper choice of insulating materials can counteract many of the thermal expansion effects discussed above. It has been well established by industry case history that the polyurethane foam bond for systems running at 250° F. is strong enough to keep the entire system acting as a bonded system. However, for systems running above these temperatures a higher temperature rated foam, such as polyisocyanurate foam, is generally required. Even in systems utilizing "high temperature" polyisocyanurate foam, the higher heat can, in some instances, begin to fry the foam at the foam/carrier pipe interface, thereby bringing into question the strength of the foam bond to the steel carrier pipe.

Age itself is also an enemy of these types of bonded foam systems, as where the piping system is on the order of 30 or 40 years old or older. It has been estimated that some of the foams of the type used in these systems lose as much as 50% of their original shear strength every 18 years.

Thus, despite the many advances seen in these pre-insulated high temperature piping systems, a need continues to exist for improved systems for preventing foam disbondment and for countering the deleterious effects of age and other factors in the environment which degrade the integrity of such bonded foam systems.

A need also exists for such an improved system which can be implemented using many of the conventionally available materials and manufacturing techniques commonly used in the industry without adding unduly to the cost of the base system.

SUMMARY OF THE INVENTION

The present invention has as its object to provide a pre-insulated piping system having an internal thrust collar arrangement which helps to protect the integrity of the envelope of foamed insulation which surrounds the inner metal carrier pipe and which is bonded to the carrier pipe and to the outer protective jacket.

AS has been briefly described, the particular type of piping system under consideration includes lengths of insulated and jacketed pre-insulated piping and, more specifically to a bonded foam pre-insulated piping system; i.e., the piping is made up of an inner carrier pipe having an interior surface and an exterior surface with an envelope of foamed insulation surrounding the inner pipe exterior surface. The envelope of foamed insulation can be, for example, an insulating material selected from the group consisting of polyurethane foams and high temperature polyisocyanurate foams. An outer protective jacket surrounds the envelope of insulation. The outer jacket can conveniently be formed from high density polyethylene. Each length of piping has a joining end for joining to an adjacent length of piping, whereby the adjacent lengths of piping provide a continuous length of fluid conduit for conveying high temperature fluids. The section of piping, as previously described, is installed in a piping system made up of other sections of piping. However, not all of the sections of piping in the piping system will necessarily include the feature of the thrust collars arrangements surrounding the inner carrier pipe.

In the preferred pre-insulated piping system of the invention, a plurality of metal thrust collars are located at predetermined intervals along the length of the inner carrier pipe on the exterior surface thereof. Each of the thrust collars comprises a hollow cylindrical body having an outer sidewall, an inner sidewall, and opposing end openings which define an initially open interior of a given diameter. The inner sidewalls have a series of metal legs which extend generally perpendicular to the inner sidewall adjacent one of the end openings thereof and which are welded to the exterior surface of the inner metal carrier pipe. In this way, the interior of the cylindrical body is spaced apart a given distance from the exterior surface of the inner metal carrier pipe and also from the outer protective jacket. A space then exists between the outer protective jacket and the outer sidewall of the cylindrical body and between the inner sidewall of the cylindrical body and the inner metal carrier pipe, the space being filled with the envelope of foamed insulation.

The presence of the metal thrust collars along the length of the inner metal carrier pipe increases the surface area contact of the insulation and metal components of the system, the increased surface area serving to prevent disbondment of the foam insulation from the inner metal carrier pipe over time. The thrust collars are also much cooler that the carrier pipe as only the steel legs are attached to the carrier pipe. Preferably, the lengths of insulated piping being joined are part of a pipeline conveying steam, hot water or other hot fluids at a temperature generally ranging above about 300° F.

A method is protecting a pre-insulated piping system from degradation over time is also shown. A first and second length of insulated and jacketed pipe are provided, each having a joining end to be joined to an end of the other length, each of the first and second lengths of pipe comprising an inner pipe, an envelope of foamed insulation surrounding the inner pipe and an outer protective jacket surrounding the envelope of insulation. The joining ends of adjacent pipe lengths are welded together to form fixed joints, whereby the adjacent pipe lengths provide a continuous length of fluid conduit for conveying high temperature fluids.

A plurality of the previously described metal thrust collars are located at predetermined intervals along the length of the inner carrier pipe on the exterior surface thereof. Each of the thrust collars comprises a hollow cylindrical body having an outer sidewall, an inner sidewall, and an initially open interior of a given diameter. The inner sidewalls have a series of metal legs which extend generally perpendicular to the inner sidewalls and which are welded to the exterior surface of the inner metal carrier pipe. In this way the interior of each of the cylindrical bodies is spaced apart a given distance from the exterior surface of the inner metal carrier pipe and also from the outer protective jacket. This arrangement causes a space to exist between the outer protective jacket and the outer sidewall of the cylindrical body and between the inner sidewall of the cylindrical body and the inner metal carrier pipe, the space being filled with the envelope of foamed insulation.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
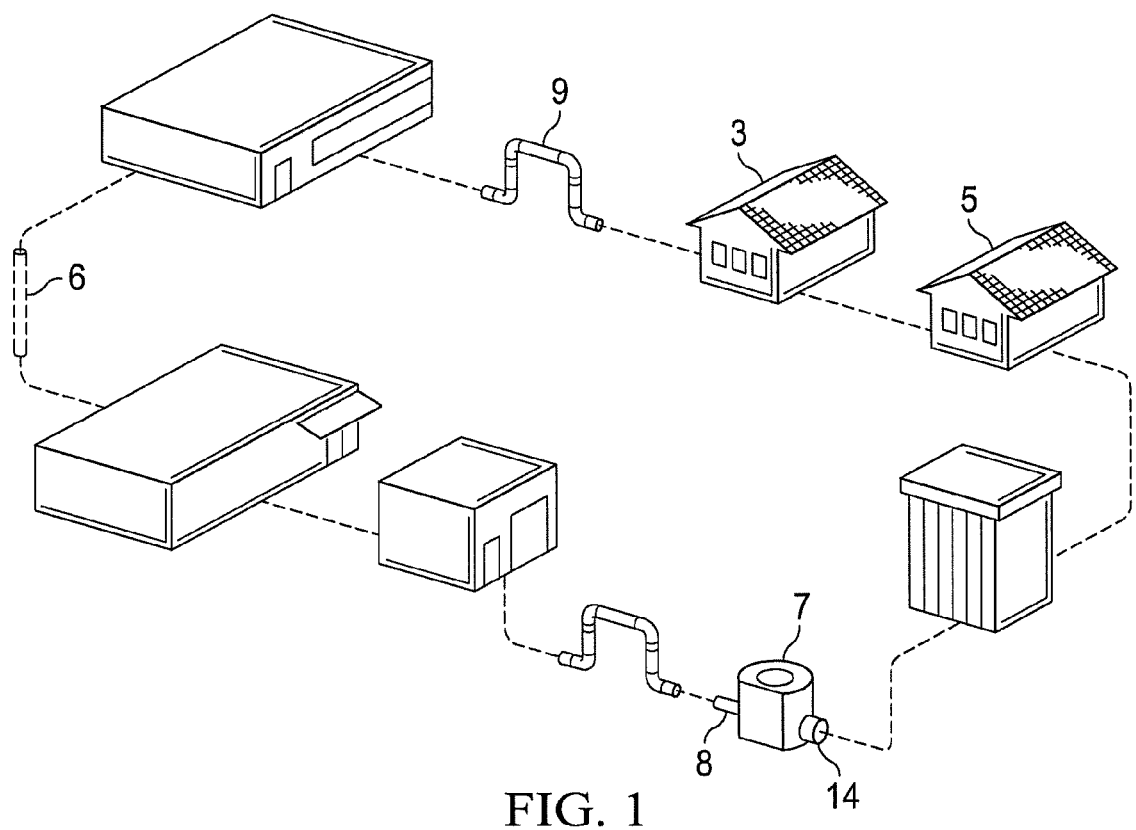
FIG. 1 is a simplified representation of a typical distributed HVAC system of the type under consideration which might utilize a high temperature fluid, such as steam, for heating.
Figure 2:
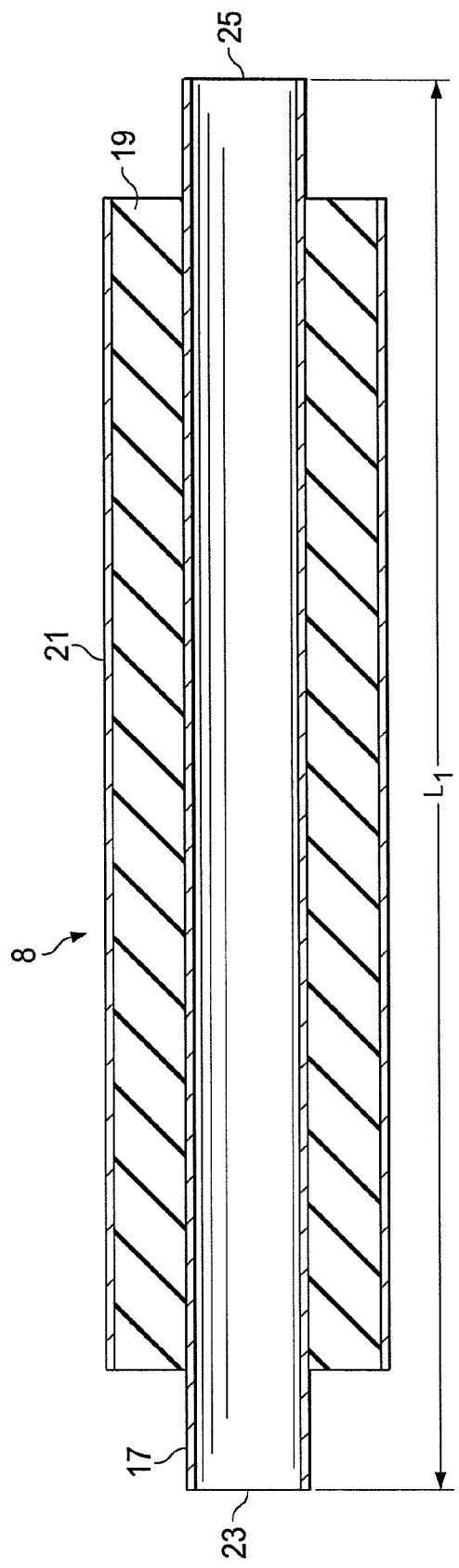
FIG. 2 is a side, partial cross sectional view of a straight run section of traditional pre-insulated piping of the type known in the prior art.

Turning first to FIGS. 1-2, there is illustrated a typical environment in which the pre-insulated piping systems of the invention might be employed. FIG. 1 shows a school campus having a number of isolated buildings 3, 5 connected by an underground insulated pipeline carrying steam which includes sections of straight run pipe 6 and which, at points, includes right angle loops or elbows 9. The sections of pipe which make up the straight runs of piping may be on the order of forty feet in length. The loops 9 are provided in a typical piping system of the type illustrated in order to compensate for expansion and contraction forces which are exerted on the piping. The piping system will also typically include one or more manholes or "valve pits" 7. The valve pits 7 are typically formed of cast concrete and have portholes 14 where the piping (8 in FIG. 1) enters and exits the manholes.

FIG. 2 is a partial cross sectional view of a length $L_1$ of prior art pre-insulated piping of the type used in the piping system shown in FIG. 1. The pre-insulated section of piping 8 includes an inner pipe 17, typically formed of steel, an envelope of foamed insulation 19 surrounding the inner pipe and outer protective jacket 21 surrounding the envelope of insulation. The joining ends (shown generally as 23, 25 in FIG. 2) of adjacent pipe lengths are affixed, as by being welded together and are then covered with insulating layers and an outer jacket similar to the remainder of the length of pipe. The welded pipe ends form fixed joints, whereby the adjacent pipe lengths provide a continuous fluid conduit for conveying high temperature fluids. The outer protective jacket 21 in FIG. 2 is typically formed of high density polyethylene (HDPE) or a similar polyolefin type material. The following references, among others, teach the manufacture of such prior art systems: U.S. Pat. No. 3,793,4111; U.S. Pat. No. 4,084,842; and U.S. Pat. No. 4,221,405, all to Stonitsch et al.; as well as U.S. Pat. No. 7,418,979; U.S. Pat. No. 8,468,677; U.S. Pat. No. 8,544,502; U.S. Pat. No. 6,547,908; and U.S. Pat. No. 5,736,715, all assigned to Thermacor Process, Inc., the assignee of the present invention.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy metal material for the inner carrier pipes. For high temperature systems, the surrounding envelope of foam insulation is typically formed of closed cell polyisocyanurate. The outer protective jacket can be formed of a suitable polyolefin, such as polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350° F. and higher will be encountered. The expected operating temperature of the pipeline will determine the type of outer foam insulation utilized. For example, 250° F. is the present temperature limitation at which polyurethane foam is used in bonded foam systems. Temperatures above about 250° F. require the use of higher temperature foams, such as the previously mentioned polyisocyanurate foam. The piping systems of the type illustrated in the drawings and described in the discussion which follows are typically utilized to convey fluids at high temperature and/or pressures. For example, a typical steam line might be conveying fluid at, for example, 250-350° F.

The present invention is an enhancement or improvement to presently available pre-insulated bonded foam piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406™ High Temp Steel Piping System. Typical published specifications for systems are as follows:

Carrier Pipe—

| | |
|---|---|
| diameter less than about 2" | A53 ERW Grade B, Std. Wt. Black Steel |
| diameter greater than about 2" | A106 SML, Std. Wt. Black Steel |

HDPE Jacket—

| Compatible with ASTM D3350 | |
|---|---|
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |

| Compatible with ASTM D3350 | |
|---|---|
| Impact Strength (ASTM D256) | 2.0 ft. lb/in. North Min. |
| Rockwell Hardness (ASTM D785) | D60 (Shore) min. |

Polyisocyanurate Insulation—

| | |
|---|---|
| Density | >2.4 lbs/ft³ |
| "K" Factor | ≤0.14 @ 70° F., ≤0.24 @ 406° F. |
| Compressive Strength | >30 psi |
| Closed Cell Content | ≥90% |
| Minimum Thickness | ≥2.5" @ 366° F., ≥3.0" @ 406° F. |

To take an actual case example, the section of piping 29 might be on the order of 40 feet in length. For a 6 inch carrier pipe 31, there might be 3 inches of foam insulation on each side of the carrier pipe so that the outer diameter of the pipe at the outer protective jacket is approximately 12.8 inches in diameter.

The present invention addresses the problem of foam disbondment which occurs due to the effects of age or other deleterious factors in the environment. This object is accomplished by providing a series of metal thrust collars on the exterior surface of the inner metal carrier pipes of the system.

Figure 3:
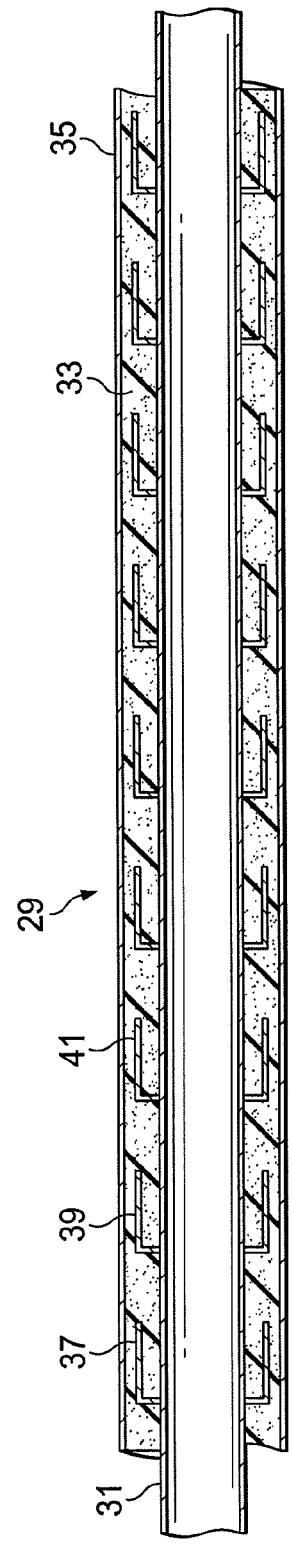
FIG. 3 is a view similar to FIG. 2, but showing the improved section of pre-insulated piping of the invention, the section of piping having metal thrust collars located on the exterior surface of the inner metal carrier pipe.
Figure 4:
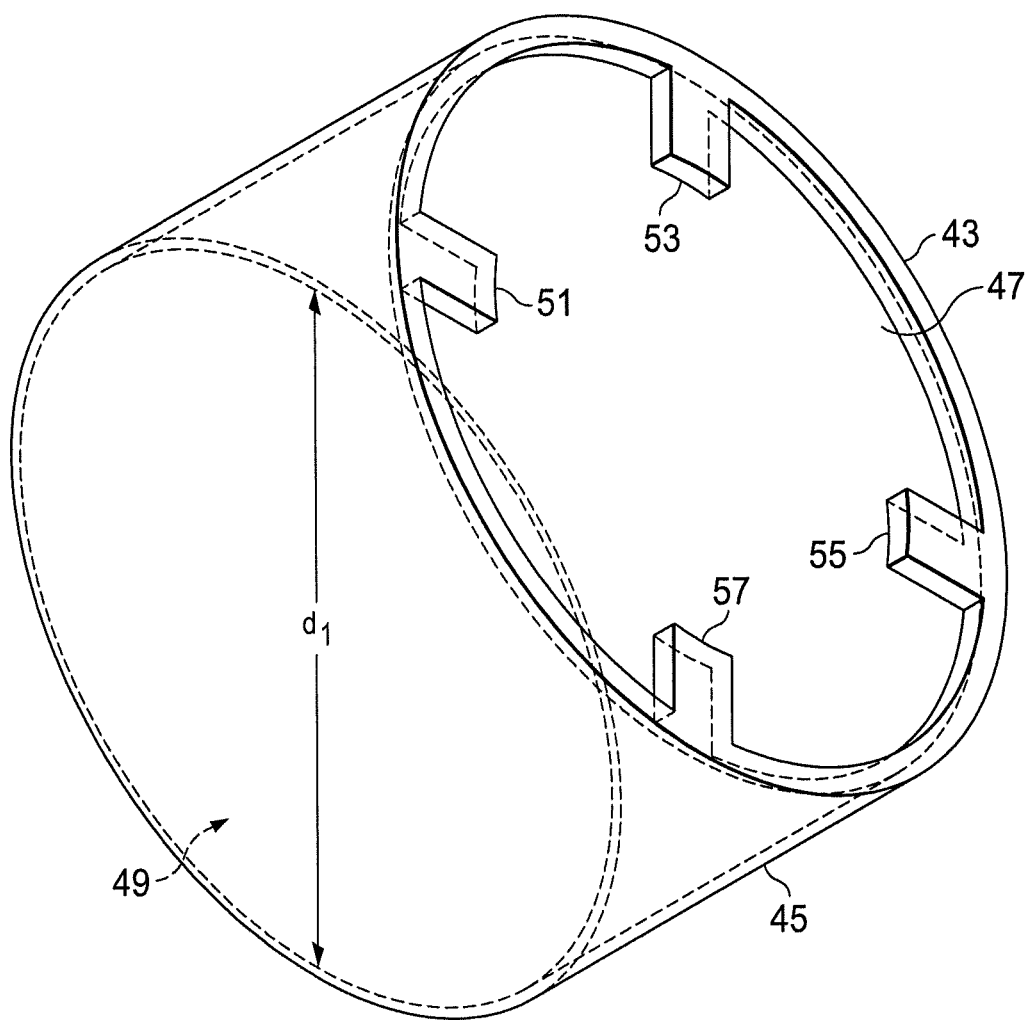
FIG. 4 is an isolated view of one of the metal thrust collars used in the piping system of FIG. 3, showing the metal legs which are welded to the exterior surface of the inner metal carrier pipe.

FIG. 3 is a side view, similar to FIG. 2, but showing the improved section of pre-insulated piping of the invention. The section of piping 29 again is made up of a centrally located, inner steel carrier pipe 31. The inner carrier pipe 31 is surrounded by an envelope of foam insulation 33 which, in turn, is surrounded by an outer HDPE jacket 35. However, as will be appreciated from FIGS. 3-6, in this case there are a series of special metal thrust collars, i.e., collars 37, 39, 41, located at selected spaced locations on the inner metal carrier pipe 31 for at least a portion of the length thereof. In the preferred form of the invention shown in FIGS. 3-6, each of the metal thrust collars comprises a hollow cylindrical body (43 in FIG. 4) having an outer sidewall 45, an inner sidewall 47, and opposing end openings which define an initially open interior 49 of a given diameter ("$d_1$" in FIG. 4). The inner sidewall 47 has a series of metal legs, in this case 51, 53, 55 and 57, which extend generally perpendicular to the inner sidewall 47 adjacent an end opening thereof and which are welded to the exterior surface (59 in FIG. 5) of the inner metal carrier pipe 31. As a result, the interior of the cylindrical body 43 is spaced apart a given distance from the exterior surface 59 of the inner metal carrier pipe and also from the outer protective jacket (61 in FIG. 5).

Because the legs 51, 53, 55 and 57 of the thrust collars are arranged generally perpendicular to the inner sidewall 47 of the hollow cylindrical body 43, a space exists between the outer protective jacket 61 and the outer sidewall 45 of the cylindrical body and between the inner sidewall 47 of the cylindrical body and the exterior surface 59 of the inner metal carrier pipe 31, the space being filled with the envelope of foamed insulation. The presence of the metal thrust collars 37, 39, 41, etc., along the length of the inner metal carrier pipe 31 increases the surface area contact between the bonded foam insulation and metal components of the system. This increased surface area contact serves to prevent disbondment of the foam insulation from the inner metal carrier pipe 31 and, in turn, from the outer protective jacket 35.

As briefly described in the background discussion, the actual foam selected for use in the piping systems of the invention will typically be either selected from among polyurethane foams and polyisocyanurate foams. In the case of the higher temperature systems operating at above say 250° F., the preferred foam for bonding with the inner metal carrier pipe 31 will be a high temperature polyisocyanurate foam. Both of these classes of foams are familiar to those skilled in the relevant pre-insulated piping arts. The outer protective jacket will again typically be a synthetic polyolefin, such as high density polyethylene (HDPE).

Using these general types of materials, the lengths of insulated piping being joined can advantageously be used as a part of a pipeline conveying steam, hot water or other hot fluids at a temperatures above, for example, about 200° F.

In the preferred systems of the invention, the inner metal carrier pipe 31 is formed of steel of a given gauge suitable for conveying steam, hot water and similar fluids, for example ANSI Schedule 40 to Schedule 80 black steel pipe. The thrust collars are typically formed of a metal which is of a lighter gauge than the metal of the inner metal carrier pipe, for example 18 gauge steel. Other materials may also be used as well, such as aluminum or lighter weight steel products.

Although the exact dimensions of the metal thrust collars may vary, depending upon the application, for a 6 inch inner metal carrier pipe, one example thrust collar had an approximate 12 inch internal diameter and a outer length of approximately 6 inches.

Figure 5:
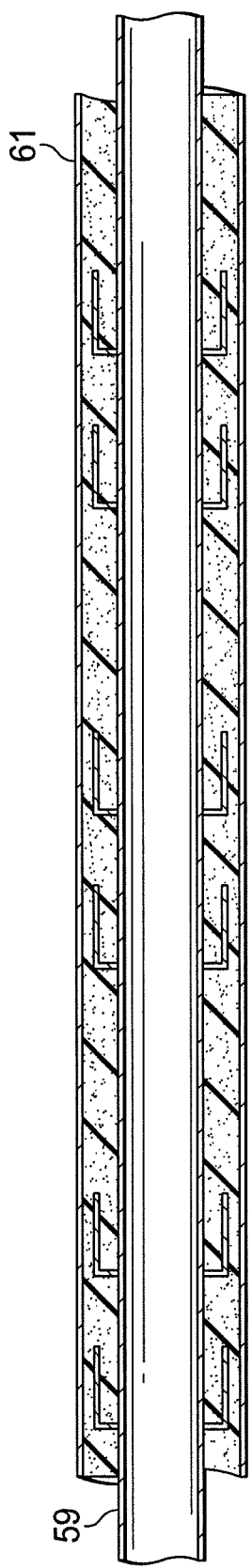
FIGS. 5 and 6 are views similar to FIG. 3, but showing different alternative spacing of the metal thrust collars along the length of the inner metal carrier pipe.
Figure 6:
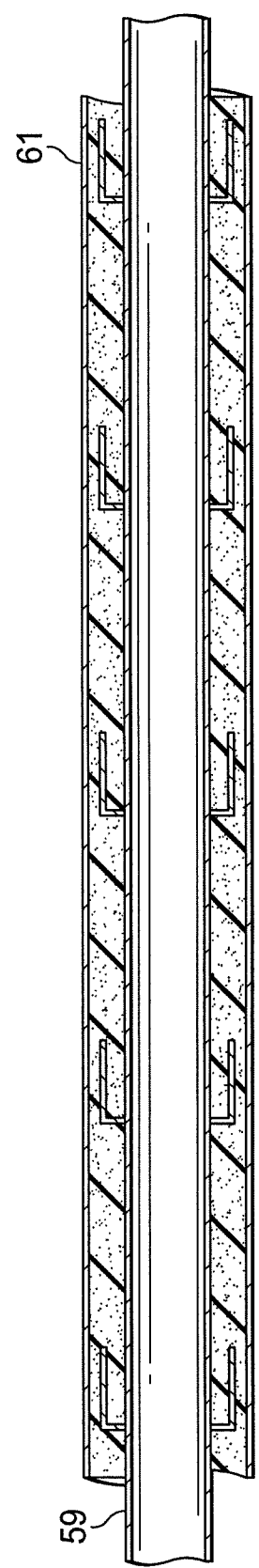

It will also be appreciated that the exact number and spacing of the thrust collars may vary depending upon the end application of the piping system. Thus, as shown in FIG. 3, the thrust collars may be evenly spaced. However, as shown in FIG. 5, the thrust collars may also be arranged in an uneven pattern, i.e., located at oddly spaced intervals along the length of the inner metal carrier pipe.

In the method of utilizing the metal thrust collars of the invention, a piping system is first provided as described with the metal thrust collars located at spaced intervals along the length of the inner metal carrier pipe. The joining ends of adjacent pipe lengths are welded together to form fixed joints, whereby the adjacent pipe lengths provide a continuous length of fluid conduit for conveying high temperature fluids. The presence of the metal thrust collars along the length of the inner metal carrier pipe increases the surface area contact of the insulation and metal components of the system, the increased surface area serving to prevent disbondment of the foam insulation from the inner metal carrier pipe over time.

An invention has been provided with several advantages. By incorporating the special metal thrust collars of the invention in a pre-insulated pipeline of the type under discussion, the effects of age, or other deleterious effects, on the shear strength of the bonded foam can be counteracted to some extent. This helps to insure that the pre-insulated piping system will remain fully bonded over an extended lifetime. The system incorporates several existing, commercially available materials or components, thereby simplifying manufacture and assembly. The thrust collar arrangement is itself relatively simple in design and economical to thereby implement in a variety of pre-insulated piping installations.

While the invention has been shown has been shown in only one of its forms, it is not thus limited but is susceptible to various change and modifications without departing from the spirit thereof.

What is claimed is:

1. An insulated piping system for conveying high temperature fluids, comprising:
a first and second length of insulated and jacketed pipe, each having a joining end to be joined to an end of the other length, each pipe length comprising an inner metal carrier pipe having an interior surface and an exterior surface, an envelope of foamed insulation surrounding the inner metal carrier pipe exterior surface, and an outer protective jacket surrounding the envelope of insulation, the joining ends of adjacent metal carrier pipe lengths being welded together to form fixed joints, whereby the adjacent pipe lengths provide a continuous length of fluid conduit for conveying high temperature fluids;
a plurality of metal thrust collars located at predetermined intervals along the length of the inner carrier pipe on the exterior surface thereof, each of the thrust collars comprising a hollow cylindrical body having an outer sidewall, an inner sidewall, and opposing end openings which define an initially open interior of a given diameter, the inner sidewall having a series of metal legs which extend generally perpendicular to the inner sidewall adjacent an end opening thereof and which are welded to the exterior surface of the inner metal carrier pipe, whereby the interior of the cylindrical body is spaced apart a given distance from the exterior surface of the inner metal carrier pipe and also from the outer protective jacket;
whereby a space exists between the outer protective jacket and the outer sidewall of the cylindrical body and between the inner sidewall of the cylindrical body and the inner metal carrier pipe, the space being filled with the envelope of foamed insulation.

2. The insulated piping system of claim 1, wherein the presence of the metal thrust collars along the length of the inner metal carrier pipe increases the surface area contact of the insulation and metal components of the system, the increased surface area serving to prevent disbondment of the foam insulation from the inner metal carrier pipe.

3. The insulated piping system of claim 2, wherein the foam insulation is selected from the group consisting of polyurethane foams and polyisocyanurate foam.

4. The insulated piping system of claim 3, wherein the outer protective jackets of the insulated and jacketed pipe are formed from a synthetic polyolefin.

5. The insulated piping system of claim 4, wherein the lengths of insulated piping being joined are part of a pipeline conveying steam, hot water or other hot fluids at a temperature in the range of above about 200° F.

6. The insulated piping system of claim 5, wherein the inner metal carrier pipe is formed of steel of a given gauge and wherein the metal thrust collars are formed of a steel which is of a lighter gauge than that of the inner metal carrier pipe.

7. The insulated piping system of claim 6, wherein the metal thrust collars are located at evenly spaced intervals along the length of the inner metal carrier pipe.

8. The insulated piping system of claim 6, wherein the metal thrust collars are located at oddly spaced intervals along the length of the inner metal carrier pipe.

9. A method of increasing the long term structural integrity of insulated piping used to form a high temperature fluid conveyance system, the method comprising the steps of:
providing a first and second length of insulated and jacketed pipe, each having a joining end to be joined to an end of the other length, each of the first and second lengths of pipe comprising an inner pipe, an envelope of foamed insulation surrounding the inner pipe and an outer protective jacket surrounding the envelope of insulation;
the joining ends of adjacent pipe lengths being welded together to form fixed joints, whereby the adjacent pipe lengths provide a continuous length of fluid conduit for conveying high temperature fluids;

locating a plurality of metal thrust collars at predetermined intervals along the length of the inner carrier pipe on the exterior surface thereof, each of the thrust collars comprising a hollow cylindrical body having an outer sidewall, an inner sidewall, and opposing end openings which define an initially open interior of a given diameter, the inner sidewall having a series of metal legs which extend generally perpendicular to the inner sidewall and which are welded to the exterior surface of the inner metal carrier pipe, whereby the interior of the cylindrical body is spaced apart a given distance from the exterior surface of the inner metal carrier pipe and also from the outer protective jacket;

whereby a space exists between the outer protective jacket and the outer sidewall of the cylindrical body and between the inner sidewall of the cylindrical body and the inner metal carrier pipe; and filling the space with the envelope of foamed insulation.

10. The method of claim 9, wherein the presence of the metal thrust collars along the length of the inner metal carrier pipe increases the surface area contact of the insulation and metal components of the system, the increased surface area serving to prevent disbondment of the foam insulation from the inner metal carrier pipe.

11. The method of claim 10, wherein the foam insulation is selected from the group consisting of polyurethane foams and polyisocyanurate foam.

12. The method of claim 11, wherein the outer protective jackets of the insulated and jacketed pipe are formed from a synthetic polyolefin.

13. The method of claim 12, wherein the lengths of insulated piping being joined are part of a pipeline conveying steam, hot water or other hot fluids at a temperature in the range of above about 200° F.

* * * * *